Aug. 25, 1925.
A. D. JONES
PNEUMATIC TIRE
Filed June 6, 1924
1,551,399
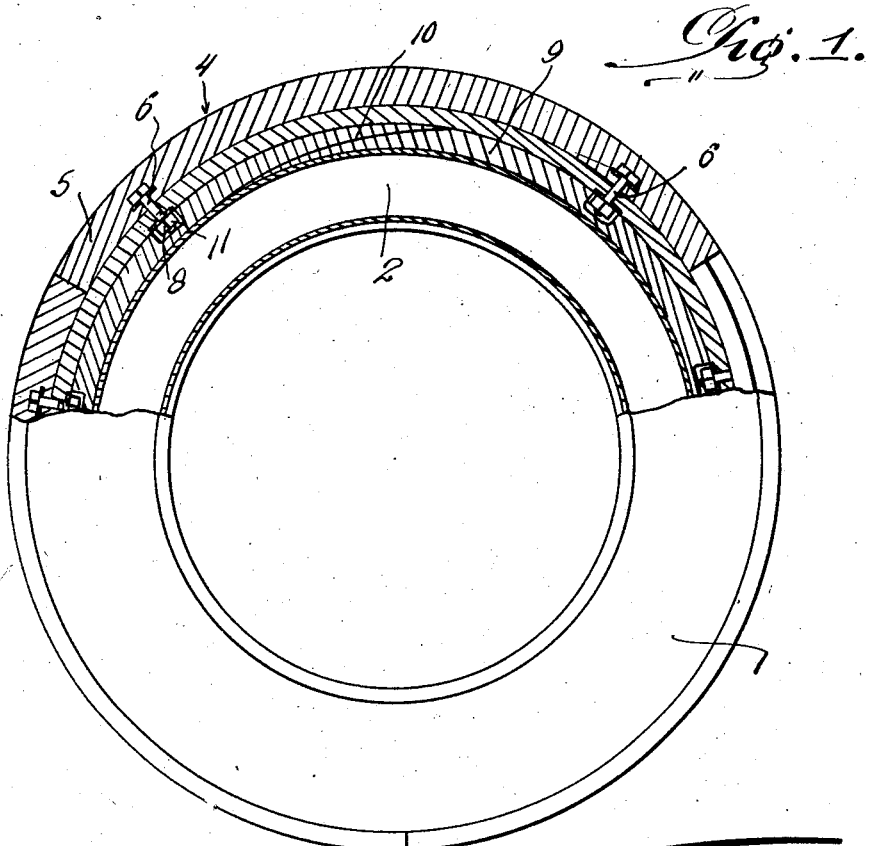
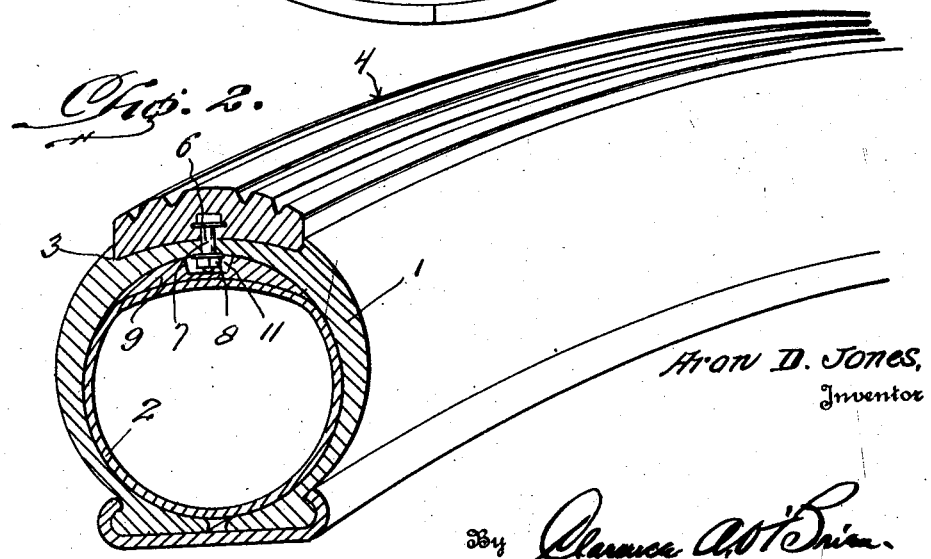
Aron D. Jones,
Inventor
By Clarence A. O'Brien
Attorney Patented Aug. 25, 1925.

1,551,399

UNITED STATES PATENT OFFICE.

ARON DAVID JONES, OF NEW HAVEN, CONNECTICUT, ASSIGNOR OF TWENTY-FIVE PER CENT TO JAMES NEWTON ROBINSON, OF NEW HAVEN, CONNECTICUT.

PNEUMATIC TIRE.

Application filed June 6, 1924. Serial No. 718,268.

*To all whom it may concern:*

Be it known that I, ARON D. JONES, a citizen of the United States, residing at New Haven, in the county of New Haven and State of Connecticut, have invented certain new and useful Improvements in a Pneumatic Tire, of which the following is a specification.

This invention relates to new and useful improvements in pneumatic tires and has for its principal object to provide a renewable tread portion therefor.

A further object of the invention is to provide a pneumatic tire of the above mentioned character, wherein means is provided for renewing the tread portion thereof when the same has become worn, thereby obviating the necessity of having to purchase a new tire thus saving considerable expense.

A still further object of the invention is to provide a pneumatic tire of the above mentioned character, wherein means is provided for preventing the circumferential movement of the renewable tread portion when the same is in position on the tire casing.

A still further object of the invention is to provide a pneumatic tire of the above mentioned character, which is simple in construction, inexpensive, strong and durable and furthermore adapted for the purposes for which it is designated.

Other objects and advantages of this invention will become apparent during the course of the following description.

In the accompanying drawings forming a part of this specification and in which like numerals designate like parts throughout the same:

Figure 1 is a side elevation of my improved pneumatic tire with parts shown in section.

Figure 2 is a sectional view showing the manner in which the tread portion is supported on the tire casing.

In the drawings wherein for the purpose of illustration is shown the preferred embodiment of my invention, the numeral 1 designates a tire casing for a pneumatic tire and arranged within the same is the usual inflatable inner tube 2. The tire casing has its walls thickened and is further provided with the circumferentially extending channel 3 which is of a substantial width in the manner clearly illustrated in Figure 2 of the drawings.

Adapted to be supported in the circumferentially extending channel 3 is the tread portion designated clearly by the numeral 4 and the same comprises a plurality of sections, each of which are of the same construction. For the purpose of securing each section of the tread portion in position within the circumferentially extending channel 3 and to prevent the circumferential movement of the tread portion in the channel, I provide each section with securing bolts 6, the same having the head portions thereof embedded in the section and extending outwardly through the bottom thereof. The threaded ends of the bolts carried by the several sections are adapted to extend through suitable openings 7 provided in the channeled portion of the tire casing and are adapted to receive thereon the nuts 8. In order that the inner tube 2 may be protected from the threaded end of the bolts and the nuts carried thereby, we provide the protector strip 9 which is of a suitable thickness and the same is interposed between the inner tube and inner wall of the tire casing in the manner illustrated more clearly in Figure 2 of the drawings. The free ends of the protector strip 9 are beveled and are adapted to overlap in the manner illustrated at 10 in Figure 1 of the drawing. The protector strip is further provided in its outer peripheral face with the cavities or pockets 11 and the same are so arranged as to receive the threaded ends of the bolts and the nuts carried thereby in the manner also clearly illustrated in Figures 1 and 2 of the drawings. In this manner the protector strip will prevent the bolts from coming in contact with the inner tube and will thus prevent any damage being done to the inner tube.

In assembling the pneumatic tire in the form shown in Figures 1 and 2 of the drawings, the tread portion, comprising the sections 5, is placed around the tire casing within the channel 3 so that the threaded ends of the bolts will extend through the openings 7 provided in the tire casing. The nuts 8 are then threaded on the threaded ends of the bolts whereby the several sections are securely supported in the channeled portion. The protector strip is then inserted in place within the tire casing and finally the inner tube is inserted in the tire casing and inflated in the usual manner.

It will thus be seen from the foregoing description, that a pneumatic tire has been provided wherein the tread portion may be renewed when the same has become worn to an appreciable extent. By renewing the tread portion of a tire, it is not necessary to purchase an entirely new tire and will thereby save considerable expense. The simplicity of my device enables the parts to be readily assembled in inserting a new tread portion on the tire, and when the tread portion is in position in the channel of the tire casing, the same will fit snugly therein and prevent any possibility of the same becoming disengaged therefrom and as clearly illustrated in the drawings, the tread portion extends above the outer surface of the tire casing. A device of the above mentioned character, will not only be simple in construction, strong and durable, but will be inexpensive.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A pneumatic tire comprising a casing provided in its tread with a circumferentially extending channel, a removable tread fitted into said channel, said tread being made up of a plurality of separate sections, said casing being formed at the center of said channel with bolt holes, fastening bolts having their headed ends embedded in said tread sections, the threaded shanks thereof extending through said bolt holes and into the interior of the inner tube chamber, and a removable inner tube protecting strip arranged within said casing and provided with circumferentially spaced recesses into which the inner threaded ends of said bolts extend, and retaining nuts at the threaded ends of said bolts.

In testimony whereof I affix my signature.

ARON DAVID JONES.